US008811510B2

(12) United States Patent
Zhuang et al.

(10) Patent No.: US 8,811,510 B2
(45) Date of Patent: Aug. 19, 2014

(54) METHOD FOR SEMI-STATICALLY ADAPTING UPLINK MULTIPLE-INPUT MULTIPLE-OUTPUT TRANSMISSION

(75) Inventors: Xiangyang Zhuang, Lake Zurich, IL (US); Tyler Brown, Mundelein, IL (US)

(73) Assignee: Motorola Mobility LLC, Libertyville, IL (US)

( * ) Notice: Subject to any disclaimer, the term of this patent is extended or adjusted under 35 U.S.C. 154(b) by 684 days.

(21) Appl. No.: 12/577,105

(22) Filed: Oct. 9, 2009

(65) Prior Publication Data

US 2011/0085618 A1  Apr. 14, 2011

(51) Int. Cl.
*H04B 7/02* (2006.01)
*H04L 1/02* (2006.01)

(52) U.S. Cl.
USPC ............................. 375/267; 375/260; 375/299

(58) Field of Classification Search
USPC ........... 375/260, 267, 299, 347; 370/203–211
See application file for complete search history.

(56) References Cited

U.S. PATENT DOCUMENTS

| | | |
|---|---|---|
| 2004/0162021 A1 | 8/2004 | Seki et al. |
| 2005/0026566 A1 | 2/2005 | Dabak et al. |
| 2007/0280360 A1* | 12/2007 | Ihm et al. ................. 375/259 |
| 2008/0064353 A1 | 3/2008 | McBeath et al. |
| 2008/0192856 A1* | 8/2008 | Jongren et al. ............. 375/267 |
| 2008/0310353 A1 | 12/2008 | Love et al. |
| 2009/0016312 A1* | 1/2009 | Tao et al. .................. 370/344 |
| 2010/0008445 A1* | 1/2010 | Khan ........................ 375/296 |
| 2010/0039928 A1* | 2/2010 | Noh et al. .................. 370/210 |
| 2010/0080154 A1* | 4/2010 | Noh et al. .................. 370/310 |
| 2010/0202560 A1* | 8/2010 | Luo et al. .................. 375/295 |
| 2010/0220801 A1* | 9/2010 | Lee et al. ................... 375/267 |
| 2010/0238913 A1* | 9/2010 | Xia et al. ................... 370/342 |
| 2010/0248641 A1 | 9/2010 | Schumacher |
| 2011/0064035 A1* | 3/2011 | Guerreiro et al. ......... 370/329 |

FOREIGN PATENT DOCUMENTS

| | | |
|---|---|---|
| CN | 1780173 A | 5/2006 |
| CN | 101039162 A | 9/2007 |
| JP | 2003018053 A | 1/2003 |
| JP | 2004-289407 A | 10/2004 |
| JP | 2005236686 A | 9/2005 |
| WO | 02091625 A1 | 11/2002 |
| WO | 2008116516 A2 | 10/2008 |

OTHER PUBLICATIONS

3rd Generation Partnership Project (3GPP); Technical Specification Group Radio Access Network; Evolved Universal Terrestrial Radio Access (E-UTRA); Physical layer—Measurements (Release 8); Mar. 2009.
Claude Oestges and Bruno Clerckx; MIMO Wireless Communications; From Real-World Propagation to Space-Time Code Design; 2007.
Tyler Brown et al.; U.S. Appl. No. 12/433,270, filed Apr. 30, 2009.

(Continued)

*Primary Examiner* — Curtis Odom
(74) *Attorney, Agent, or Firm* — Lerner, David, Littenberg, Krumholz & Mentlik, LLP (57) ABSTRACT

A method, a wireless terminal device, and a base station are disclosed. A receiving unit 408 may receive from a base station an antenna precoding instruction for an uplink transmission. A processor 304 may execute a modification of the antenna precoding instruction according to a transmit antenna adapter into a customized precoding. A transmitting unit 406 may perform the uplink transmission according to the customized precoding.

6 Claims, 10 Drawing Sheets

(56) References Cited

OTHER PUBLICATIONS

Patent Cooperation Treaty, "PCT Search Report and Written Opinion of the International Searching Authority" for International Application No. PCT/US2010/032153 Aug. 19, 2010, 13 pages.
United States Patent and Trademark Office, "Non-Final Rejection" for U.S. Appl. No. 12/433,270 dated Jun. 15, 2011, 10 pages.
Japanese Patent Office, "Reasons for Rejection" for Japanese Patent Application No. 2012-503790 dated Oct. 30, 2012, 4 pages.
Industrial Technology Research Institute; Evaluation of Downlink MIMO Transmission Mode Selection; 3 GPP TSG RAN WG1 Meeting #44-bis; R1-060774; Athens Greece; Mar. 27-31, 2006, 8 pages.
3GPP TSG RAN1#63, R1-106288 "PUSCH Mode Switching under AGI" Motorola, Jacksonville, USA; Nov. 15-19, 2010, 3 pages.
Japanese Patent Office, "Decision of Rejection" for Japanese Patent Application No. 2012-503790 dated Oct. 30, 2012, 7 pages.
The State Intellectual Property Office of the People's Republic of China Search Report, Sep. 29, 2013, all pages.

* cited by examiner

| Transmit Format 502 | CRC 504 | Power Control Information 506 | Antenna Codebook Representation 508 |
|---|---|---|---|
| | | | Antenna Precoding Instruction 510 |

500
Figure 5

| CRC 602 | UE ID 604 | Message Length 606 | Transmit Antenna Adapter Representation 608 |
|---|---|---|---|

- CRC 902
- Message Length Field 904
- UE-Preferred Review Representation 906

Figure 10
1000

- CRC 1002
- UE ID 1004
- Message Length Field 1006
- Modified Adapter Representation 1008

Figure 12

METHOD FOR SEMI-STATICALLY ADAPTING UPLINK MULTIPLE-INPUT MULTIPLE-OUTPUT TRANSMISSION

FIELD OF THE INVENTION

The present invention relates to a method and system for performing an uplink transmission with a base station. The present invention further relates to applying a customized precoding to a transmitting unit of a wireless terminal device.

INTRODUCTION

The Third Generation Partnership Project (3GPP) is developing a Long Term Evolution (LTE) standard using a physical layer based on globally applicable evolved universal terrestrial radio access (E-UTRA). In release-8 specification of LTE, an LTE base station, referred to as an enhanced Node-B (eNB), may use an array of four antennas, or even more with antenna virtualization, to broadcast a signal to a piece of user equipment (UE), such as a wireless terminal device.

Depending on different channel condition, eNB may instructs a UE on how to use its multiple antennas in the uplink transmission. For example in the case of precoding, the UE may apply a different weighting and phase offset to the signal to be sent from each of the transmit antenna. A precoding operation may be represented mathematically by a vector of complex-valued weightings applied onto the transmission signal of each antenna. The eNB may dynamically instruct a precoding matrix index (PMI), selected from a pre-defined set of matrices known to the UE. The pre-defined set of matrices is known as a codebook.

SUMMARY OF THE INVENTION

A method, a wireless terminal device, and a base station are disclosed. A receiving unit may receive from a base station an antenna precoding instruction for an uplink transmission. A processor may execute a modification of the antenna precoding instruction according to a transmit antenna adapter into a customized precoding. A transmitting unit may perform the uplink transmission according to the customized precoding.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, a mobile system, and a mobile network operator, and other embodiments that relate to the basic concepts of the invention. The mobile system may be any manner of computer, mobile device, or wireless communication device.

A method, a wireless terminal device, and a base station are disclosed. A receiving unit may receive from a base station an antenna precoding instruction for an uplink transmission. A processor may execute a modification of the antenna precoding instruction according to a transmit antenna adapter into a customized precoding. A transmitting unit may perform the uplink transmission according to the customized precoding.

A wireless terminal device with multiple transmit (Tx) antennas, due to different form factor constraints, may have many potential antenna implementations, including different antenna spacing, the use of dual-polarized or linear-polarized antenna elements, and various degrees of antenna coupling. Different antenna implementations tailored for different device form factors may often result in different levels of transmit antenna correlation, and differing antenna efficiencies. In addition, various propagation scenarios in which the devices are used, such as the hand-grip posture for handheld devices and usage posture for notebooks, may affect the antenna correlation and efficiency. The transmit antenna correlation may be learned at the base station when the channel corresponding to each of the transmit antennas of a wireless device may be estimate from an uplink sounding signal transmission. Alternatively, the wireless terminal device may estimate the transmit antenna correlation from estimating the receive antenna correlation, assuming the set of transmit antennas is a subset of the receive antennas and the downlink to uplink reciprocity holds. Even if not, the wireless terminal device may extract some coarse characteristics embedded in the receive antenna correlation. Depending on the observed channel statistics, especially the long-term property caused by antenna implementation, configuration, or usage posture, the uplink multiple-input multiple-output transmission may adapt to these channel statistics.

One case where the configuration of antennas may be adapted is when the implantation of a user equipment device may have antenna efficiency difference, also called gain imbalance. To deal with gain imbalance, a base station may use only a subset of the terminal antennas for uplink transmission, referred to as a reduced-dimension precoding. One way to support a reduced dimension precoding may be to define a "master" codebook that covers all the possibilities of dimension reduction. Since the activated antenna subset depends on the antenna configuration and usage posture, the master codebook may have to accommodate multiple possibilities, and therefore include many reduced-dimension codebooks that are essentially the same except that they apply to different antenna subset groupings. However, defining the master codebook to include basically multiple replicas of the same reduced dimension codebook to cover all possibilities may not be efficient, since the amount of control signaling may grow with the size of the codebook. Generally, the optimal choice of subset may change relatively slowly. This may be due to the optimal choice of subsets being primarily influenced by antenna gain imbalance. Antenna gain imbalance may be influenced, in turn, by such events as change in user hand grip, user posture, and antenna configuration, which occur infrequently relative to the rate of signaling the choice of precoding matrix within the codebook. While replicating a base codebook to address all permutations of antenna indexing is possible, such replication may not be the most efficient approach when re-indexing is needed fairly infrequently.

In another situation, the codebook may be defined with a particular antenna type and indexing in mind which does not match the actual implementation. In this case, the base station may change the antenna indexing. Such a decision may be based on the uplink channel observed at the base station based on the sounding signal transmitted from the user device. Precoding performance may be improved if the optimal antenna indexing is adjusted. The change in antenna indexing may be done once by a user equipment device autonomously or according to some criteria defined by the base station. Once defined, the user equipment may use the antenna indexing in all subsequent uplink transmissions, including the transmission of a sounding signal. In an alternative procedure, the user equipment may sound from antennas with a first indexing which serve as a reference index, and then potentially be changed by the base station based on the received sounding signal. In such cases the base station may signal the new antenna indexing. The appropriate indexing may change according to hand grip and user posture. Ideally, the base station may optimally determine the appropriate indexing on a semi-static basis, according to the antenna implementation, usage posture, and the predefined codebook. The base station may convey such antenna re-indexing to a user equipment device.

Similar to antenna indexing, the user equipment device may group antennas based on a property to best match the predefined codebook. For example, antenna of the same or orthogonal polarization, or antennas of close spacing, may be grouped together so that precoding may better exploit high antenna correlation for transmission directivity gain and low antenna correlation for spatial multiplexing gain. Antenna grouping may be achieved through re-indexing.

Overall, the antenna characteristics inherent to the implementation and some long-term propagation behavior may affect the long-term behavior of the channel significantly. Semi-static notification of antenna indexing, or grouping, or subset selection may be beneficial.

Figure 1:
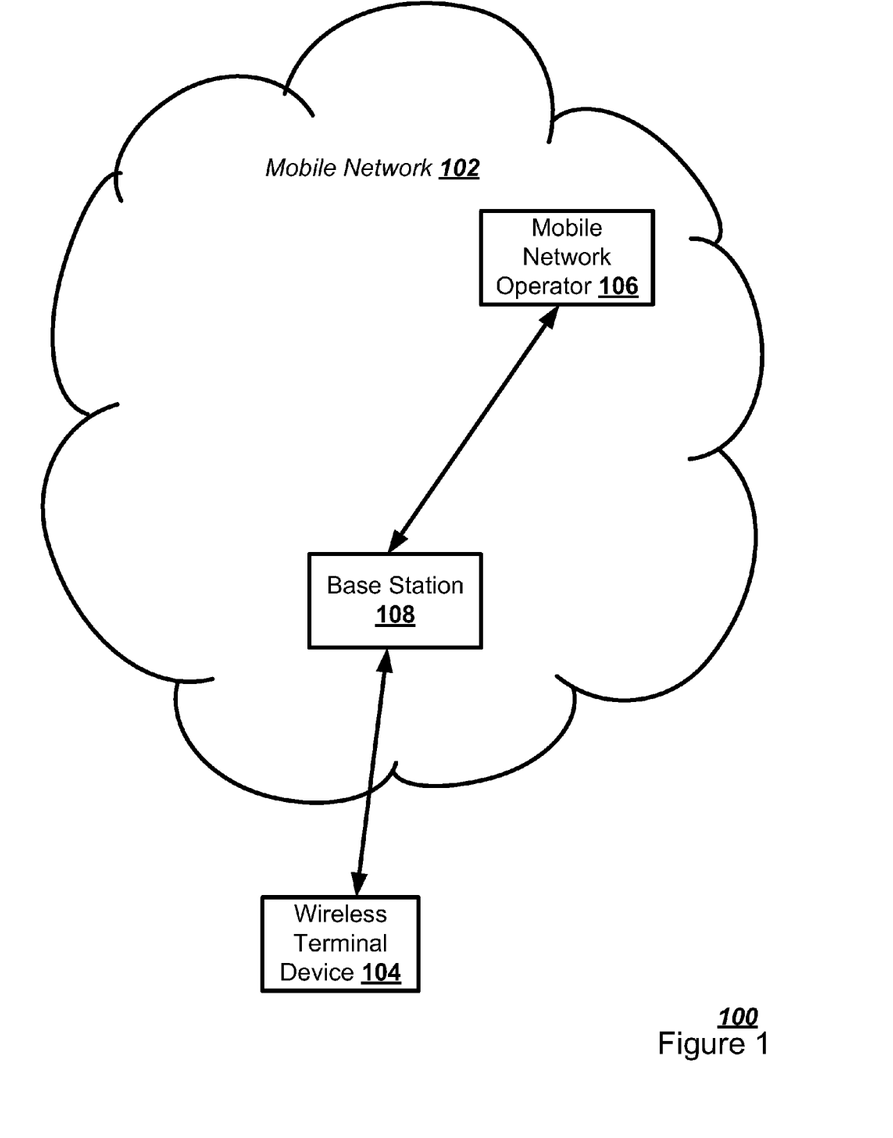
FIG. 1 illustrates in a block diagram one embodiment of a communication system.

FIG. 1 illustrates one embodiment of a communication system 100. The communication system 100 may include a core mobile network 102 that may be accessed by at least one mobile device 104, such as a wireless terminal device, or user equipment (UE). The wireless terminals 104 may be fixed or mobile. The wireless terminals 104 may also be referred to as subscriber units, mobiles, mobile stations, user, terminals, subscriber stations, user terminals, wireless communication devices, user devices, or by other terminology used in the art. Various communication devices may exchange data or information through the core mobile network 102. The core mobile network 102 may be a WiMAX network, a universal terrestrial radio access network (UTRAN) cellular network, an evolved UTRAN (E-UTRAN) cellular network, or other type of telecommunication network. A server or a series of servers controlled by a network operator, referred to herein as a network operator server 106, or a mobile network operator 106, may administer the network. The network operator server 106 may maintain a set of data to facilitate access of the core mobile network 102 by the wireless terminal device 104. The mobile system 104 may access the network via a network base station 108. A base unit 108 may also be referred to as an access point, access terminal, base, base station, Node-B, eNode-B, Home Node-B, Home eNode-B, relay node, or by other terminology used in the art.

Figure 2:
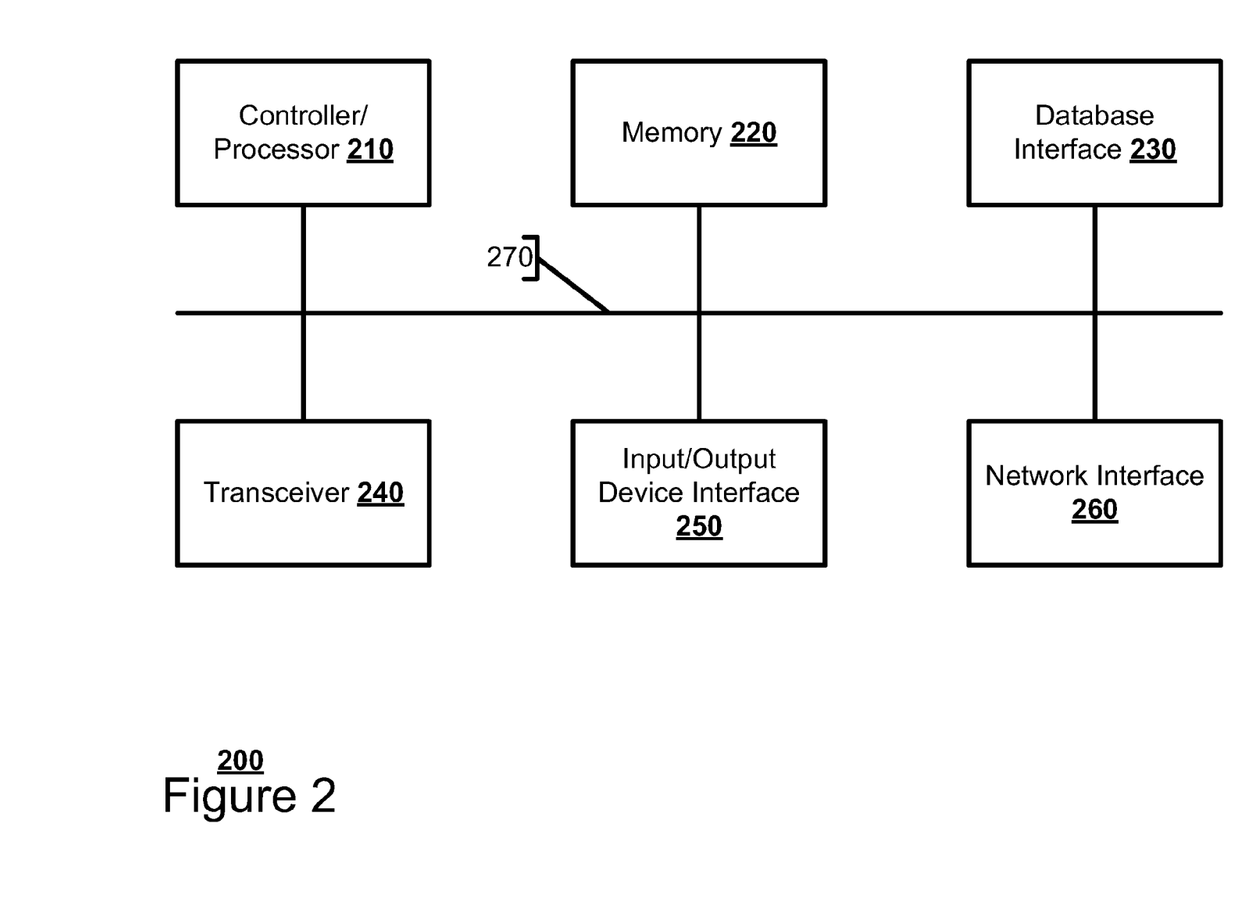
FIG. 2 illustrates a possible configuration of a computing system to act as a base transceiver station.

FIG. 2 illustrates a possible configuration of a computing system 200 to act as a network operator server 106 or a network base station 108. The computing system 200 may include a controller/processor 210, a memory 220, a database interface 230, a transceiver 240, input/output (I/O) device interface 250, and a network interface 260, connected through bus 270. The network server 200 may implement any operating system. Client and server software may be written in any programming language, such as C, C++, Java or Visual Basic, for example. The server software may run on an application framework, such as, for example, a Java® server or .NET® framework The controller/processor 210 may be any programmed processor known to one of skill in the art. However, the disclosed method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the disclosed method as described herein may be used to implement the disclosed system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. The database interface 230 may be used by the controller/processor 210 to access the database. The database may contain subscriber information for each mobile system 104 that may access the mobile network 102. Further, the database may maintain network performance data, such as network topology, network geographic location and peer proximity, network load distribution, and other network data.

The transceiver 240 may create a connection with the mobile device 104. The transceiver 240 may be incorporated into a base station 200 or may be a separate device.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network. The network connection interface 260 may be used to connect a client device to a network. The components of the network server 200 may be connected via an electrical bus 270, for example, or linked wirelessly.

Client software and databases may be accessed by the controller/processor 210 from memory 220, and may include, for example, database applications, word processing applications, as well as components that embody the disclosed functionality of the present invention. The network server 200 may implement any operating system. Client and server software may be written in any programming language. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
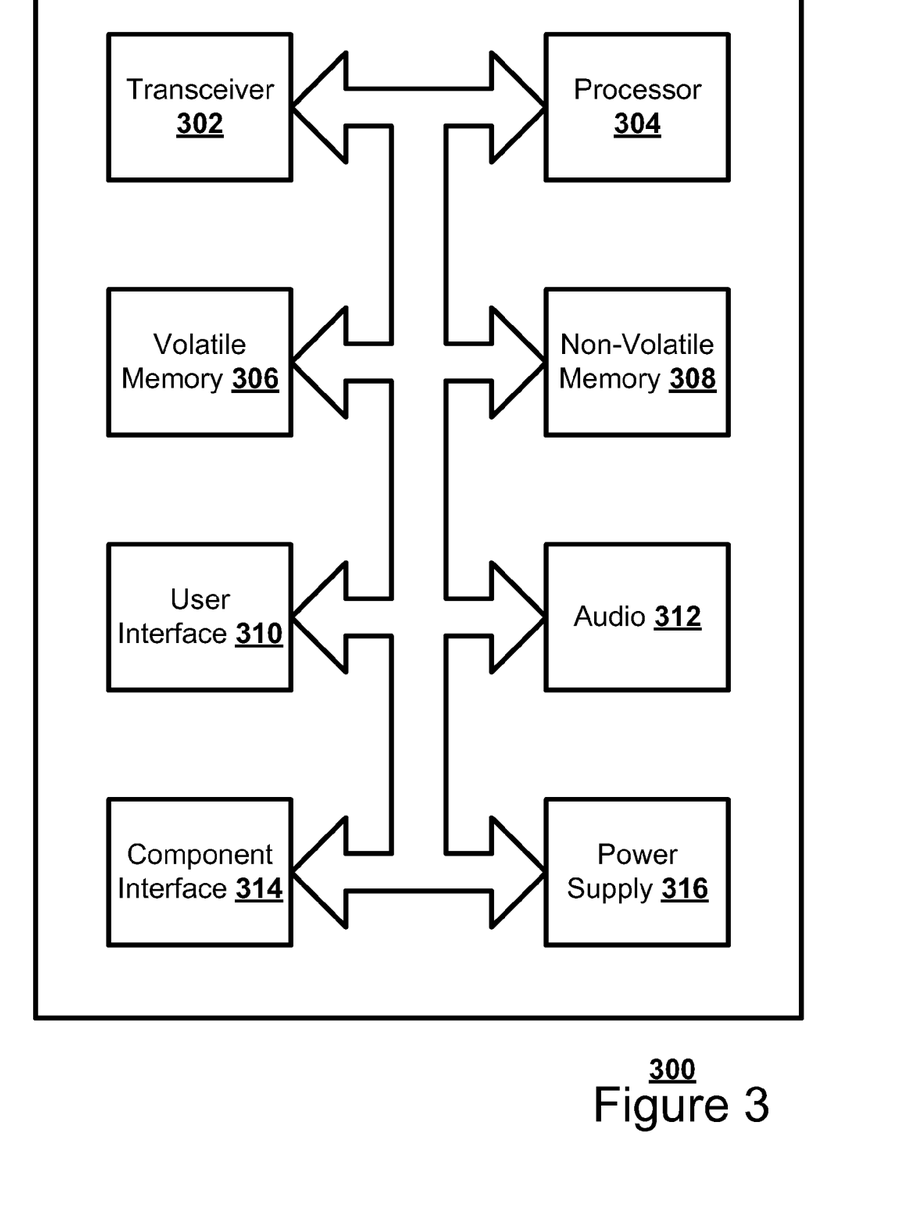
FIG. 3 illustrates, in a block diagram, one embodiment of a mobile system or electronic device to create a radio connection.

FIG. 3 illustrates one embodiment of a wireless terminal device 300, capable of acting as a mobile system or electronic device. For some embodiments of the present invention, the mobile device 300 may also support one or more applications for performing various communications with a network. The mobile device 300 may be a handheld device, such as, a mobile phone, a laptop, or a personal digital assistant (PDA). For some embodiments of the present invention, the user device 300 may be WiFi® capable device, which may be used to access the network mobile for data or by voice using VOIP.

The mobile device 300 may include a transceiver 302, which is capable of sending and receiving data over the mobile network 102. The mobile device 300 may include a processor 304 that executes stored programs. The mobile device 300 may also include a volatile memory 306 and a non-volatile memory 308 to act as data storage for the processor 304. The mobile device 300 may include a user input interface 310 that may comprise elements such as a keypad, display, touch screen, and the like. The mobile device 300 may also include a user output device that may comprise a display screen and an audio interface 312 that may comprise elements such as a microphone, earphone, and speaker. The mobile device 300 also may include a component interface 314 to which additional elements may be attached, for example, a universal serial bus (USB) interface or a geographical positioning system (GPS). Finally, the mobile device 300 may include a power supply 316.

Figure 4:
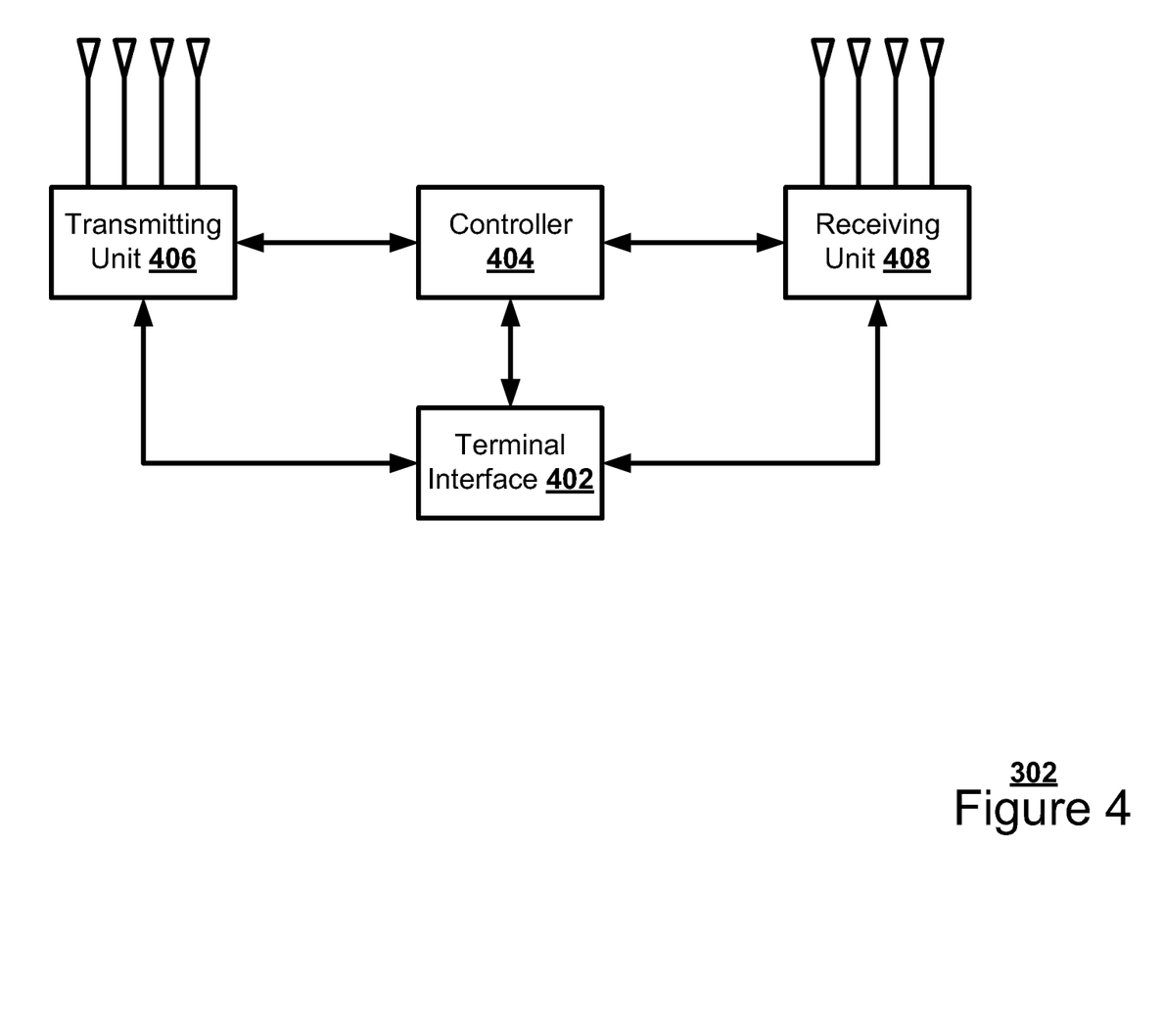
FIG. 4 illustrates, in a block diagram, one embodiment of a transceiver.

FIG. 4 illustrates one embodiment of a transceiver 302. A terminal interface 402 may send received signals to the UE device 104 and receive transmissions from the UE device 104. A controller 404 may configure a transmitting unit 406 according to an antenna codebook received from the base station 108 by a receiving unit 408. Alternately, the transceiver 302 may forgo the controller 404 and have the configuration performed by the processor 304 of the UE device 104.

Figure 5:
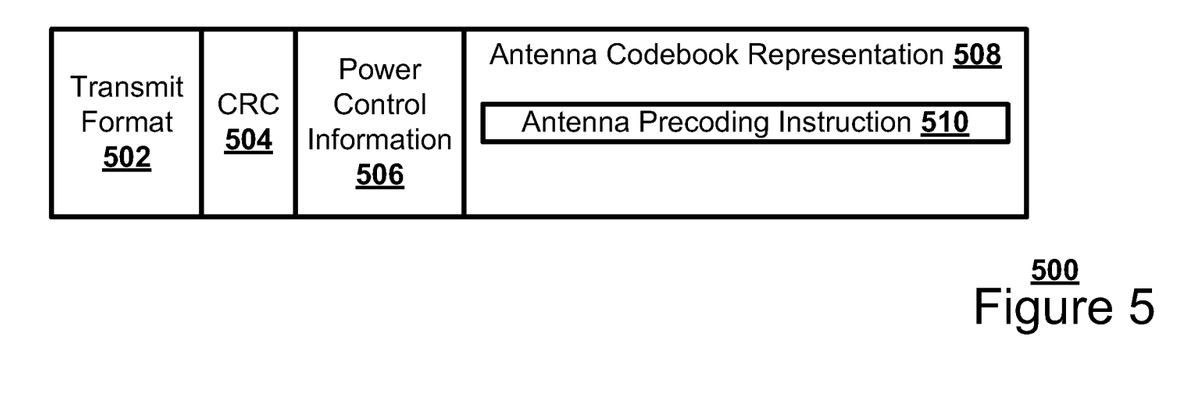
FIG. 5 illustrates, in a block diagram, one embodiment of a control message transmission.

The base station 108 may send the antenna precoding instruction to the UE device 104 in a control message transmission. FIG. 5 illustrates one embodiment of a control message transmission 500. The control message transmission 500 may have a transmission format field 502 to indicate the format of the subsequent transmissions. The control message transmission 500 may have a cyclical redundancy check (CRC) filed 504 to aid in determining if the message is correctly by the UE device 104. The control message transmission 500 may have power control information 506 to aid the UE device 104 in setting its transmit power. The control message transmission 500 may have an antenna codebook 508 describing one or more antenna precoding instruction 510 to indicate to the UE device 104 the precoding matrix to be used on a subsequent matrix to be used on a subsequent uplink transmission. The base station 108 may send the control message transmission 500 on a recurring basis to the UE device 104.

Figure 6:
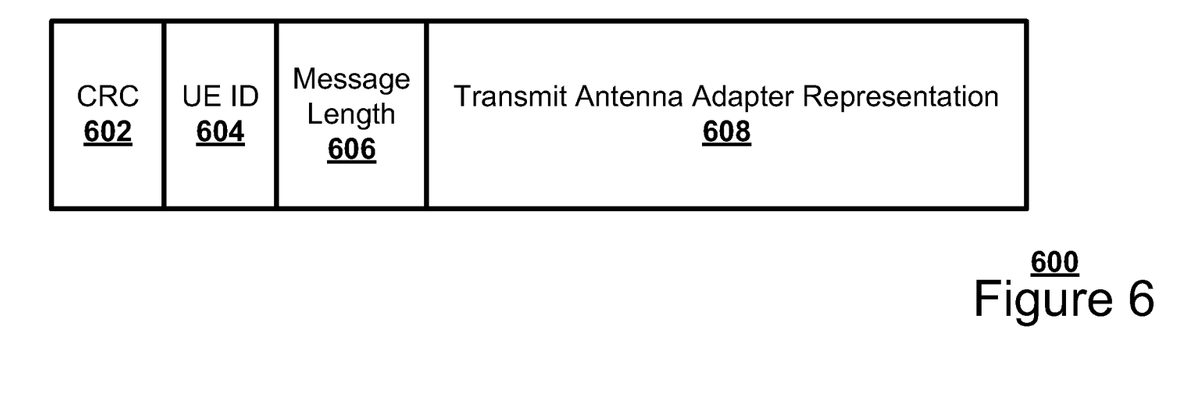
FIG. 6 illustrates, in a block diagram, one embodiment of an adapter message transmission.

The antenna codebook may be customized to an individual UE device 104 using a transmit antenna adapter. The base station 108 may send a representation of a transmit antenna adapter to the UE device 104 in an adapter message transmission. FIG. 6 illustrates one embodiment of an adapter message transmission 600. The adapter message transmission 600 may have a CRC 602 to aid in the detection of errors in the message received by the UE device 104. The adapter message transmission 600 may have a UE ID 604 for the UE device 104 and a message length field 606. The adapter message transmission 600 may have a transmit antenna adapter representation 608 describing a transmit antenna adapter. The transmit antenna adapter may modify an antenna precoding instruction 510 to instruct a transmitting unit 406 to configure a set of transmit antennas. The base station may also send the adapter message transmission 600 on a recurring basis to the UE device 104. The base station may send the adapter message transmission 600 at a different interval from the control message transmission 500.

The antenna adapter may be represented in various forms, but more generically as a matrix "A" to be used in uplink transmission, possibly together with the precoding matrix $V_{P \times N}$, in the following equation:

$$X_{Mt \times N} = A_{Mt \times P} * V_{P \times N} * S_{N \times 1}$$

where $X_{Mt \times N}$ is the transmitted signal from all Mt antennas for N streams or layers of data represented by $S_{N \times 1}$ (i.e., rank-N), and $V_{P \times N}$ is the precoding matrix of dimension P rows, where the value P is between N and Mt. The precoding matrix $V_{P \times N}$ may be absent if it is an identity matrix. In one embodiment, the transmit antenna adapter representation 608 may be a bit field, which indicates the antenna adapter to be applied. A bit field of with a value of "0", for example, may indicate for the UE device 104 to use the adapter described by the matrix $A_{Mt \times P}(0)$, while a bit field with a value of "1" may indicate for the UE device 104 to use the adapter described by the matrix $A_{Mt \times P}(1)$, $A_{Mt \times P}(0)$ and $A_{Mt \times P}(1)$ where represent two possible adapters in a set of possibilities. The transmit antenna adapter may modify the antenna precoding instruction 510 according to multiple schemes indicated in the adapter representation, including antenna subset selection, antenna index permutation, or antenna pattern virtualization. For example, when the transmit antenna adapter modifies the antenna precoding instruction 510 by antenna subset selection, the matrix $A_{Mt\times P}$ may be an antenna subset selection matrix. A subset selection matrix may be a matrix with entries with values of either "0" or "1", have at most one "1" in each row. For example, if antenna 1 and 3 is selected for transmission out of all 4 UE antennas, the matrix $A_{Mt\times P}$ is a selection matrix and may be represented as:

$$A_{Mt\times P} = \begin{bmatrix} 1 & 0 \\ 0 & 0 \\ 0 & 1 \\ 0 & 0 \end{bmatrix}.$$

As described earlier, a UE device 104 may implicitly index the antennas when performing uplink sounding signal transmission. The base station 108 may want to re-index the antennas based on the observed long-term statistics so that a codebook may deliver better performance, as opposed to the original codebook without antenna re-indexing. The original codebook without re-indexing may be represented by an identity matrix $A_{Mt\times P}=I_{4\times 4}$. The base station 108 may request the UE device 104 to re-index its transmit antennas by sending an adapter message transmission 600 indicating the transmit antenna adapter may re-index the transmit antennas. The re-indexing may be represented by a permutation matrix $A_{Mt\times P}$. A permutation matrix may be a matrix with exactly one entry in each column equal to "1" and the remaining entries equal to "0". For example, the UE device 104 may re-index the 4 antennas to [1,3,2,4] with the following permutation matrix:

$$A_{Mt\times P} = \begin{bmatrix} 1 & 0 & 0 & 0 \\ 0 & 0 & 1 & 0 \\ 0 & 1 & 0 & 0 \\ 0 & 0 & 0 & 1 \end{bmatrix}.$$

The base station 108 may determine, on a semi-static basis, the best antenna indexing based on the antenna correlation observed. More specifically, the base station 108 may decide which permutation gives the best performances under the observed antenna correlation. The decision may be specific to an implementation based on, for example, criterion used in typical codebook design. The codebook design criterion may include, for example, minimal codeword distance.

Not limited to antenna selection or indexing, another scheme for modifying the antenna precoding may employ the adapter matrix $A_{Mt\times P}$ based on the user equipment transmit antenna correlation or covariance matrix "R". In a particular example, $A_{Mt\times P}=R^{1/2}$, or the square root of "R", may be used for adaptive uplink precoding. Here "R" may be the correlation or covariance matrix of the vector of channels corresponding to the link between each of the transmit antennas and a certain receive antenna, or the average of several such covariance matrices, with each corresponding to one receive antenna of the base unit. In general, "antenna pattern virtualization" may be referred to as the process of applying a unitary matrix to transform a set of physical antennas to a set of virtualized antennas via weighting the set of physical antennas according to the unitary matrix. The above covariance matrix based antenna adaption scheme may be referred to as antenna pattern virtualization.

Regardless of which of the three methods of transmit antenna adaption used: subset selection, antenna re-indexing, or covariance matrix-based pattern virtualization, and thus the form of the adapter matrix $A_{Mt\times P}$; the user equipment may combine the precoding matrix index indicated in the precoding instruction, represented by $V_{P\times N}$, with the adapter matrix $A_{Mt\times P}$ to determine the actual precoding matrix. If more than one non-zero entry is present in any row of the combined precoding matrix $A_{Mt\times P}*V_{P\times N}$, the emitted signal on the corresponding antenna may be the weighted superposition of two or more waveforms.

Note that the three methods of transmit antenna adaptation mentioned: subset selection, antenna re-indexing, or covariance matrix-based pattern virtualization, may be applied to a submatrix of the precoding matrices. For example, with three layers or data streams, the precoding matrix $V_{P\times N}$ may have three columns. A submatrix having only two columns, for example, may be adapted according to the adapter, instead of having the whole matrix adapted. In other words, the adapter matrix may apply to the submatrix of any precoding matrix indicated in the precoding instruction.

Figure 7:
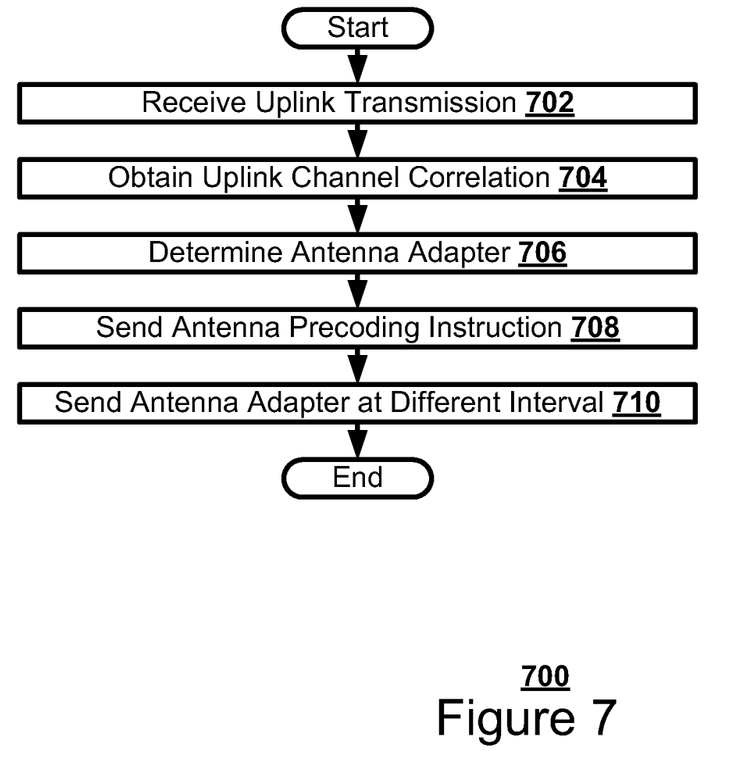
FIG. 7 illustrates, in a flowchart, one embodiment of a method for receiving an uplink transmission.

FIG. 7 illustrates one embodiment 700 of a method for receiving an uplink transmission. The base station 108 may receive an uplink transmission from the UE device 104 (Block 702). The base station 108 may obtain an uplink channel correlation of the uplink transmission (Block 704). The base station 108 may determine a transmit antenna adapter based on the uplink channel correlation and a codebook (Block 706). The decision may also be based on an uplink channel correlation obtained from the uplink transmission and the precoding indicated by the antenna precoding instruction. The transmit antenna adapter may be a set of modifications to the precoding operation in order to make the antenna precoding instruction 510 better match the antenna configuration of the UE device 104 and the transmission characteristics of the uplink transmission. The base station 108 may send the UE device 104 an antenna precoding instruction 510 for an uplink transmission (Block 708). The base station 108 may send the antenna precoding instruction 510 on a recurring basis. The base station 108 may send a transmit antenna adapter representation to the UE device 102 (Block 710). The transmit antenna adapter representation may describe to the UE device 104 the transmit antenna adapter. The base station 108 may send the transmit antenna adapter representation on a different interval than the antenna precoding instruction 510.

Figure 8:
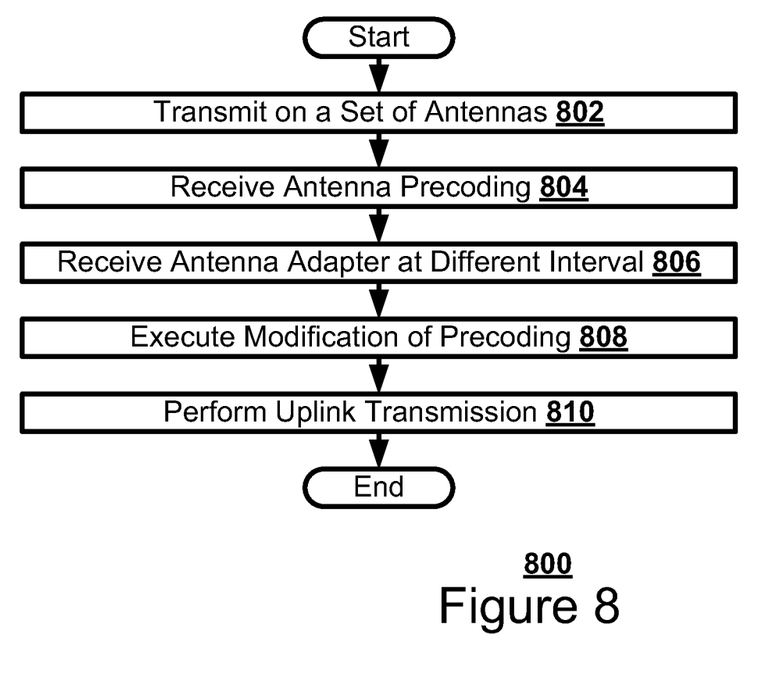
FIG. 8 illustrates, in a flowchart, one embodiment of a method for performing an uplink transmission with a base station created transmit antenna adapter.

FIG. 8 illustrates one embodiment of a method 800 for performing an uplink transmission with a base station created transmit antenna adapter. The UE device 104 may transmit from a set of antennas to allow the base station 108 to estimate the uplink channel (Block 802). The UE device 104 may receive from the base station 108 a control message transmission 500 containing an antenna precoding instruction 510 for an uplink transmission (Block 804). The UE device 104 may receive from the base station 108 a transmit antenna adapter representation (Block 806). The UE device 104 may receive both the antenna precoding instruction 510 and the antenna adapter representation on a recurring basis. The UE device 104 may receive the antenna precoding instruction 510 on a different interval than the transmit antenna adapter representation. The UE device 104 may execute a modification of the antenna precoding instruction 510 into a customized precoding according to a transmit antenna adapter (Block 808). The UE device 104 may then perform the uplink transmission according to the customized precoding (Block 810).

Alternatively, a UE device 104 may adapt the transmit antennas autonomously based on measurement of the downlink channel and may communicate the information back to the base station 108. The downlink measurement may capture the uplink channel in case of a time division duplexing system which may have channel reciprocity between uplink and downlink. Even in frequency division duplexing, a UE device 104 may still be able to extract a transmit antenna property to make a decision on the preferred antenna adaptation.

Figure 9:
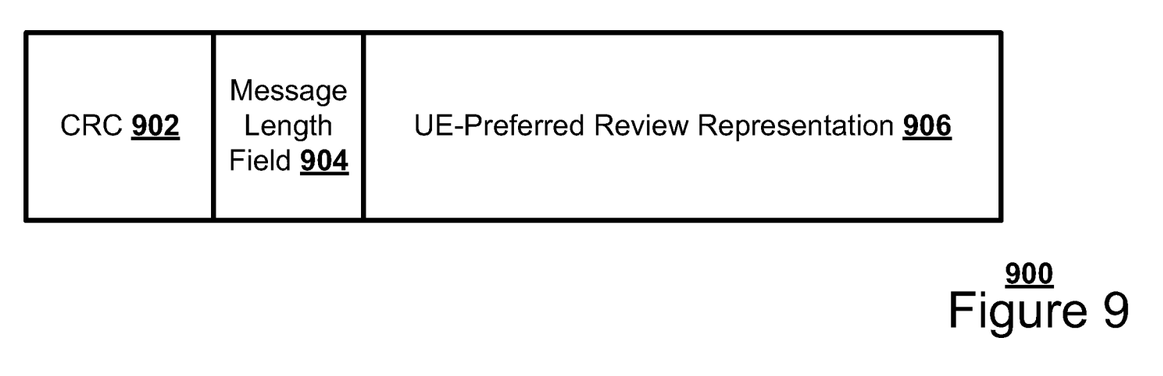
FIG. 9 illustrates, in a block diagram, one embodiment of a feedback message transmission.

The UE device 104 may determine the transmit antenna adapter based on a downlink transmission. The UE device 104 may then send a representation of a UE-preferred transmit antenna adapter to the base station 108 for confirmation in a feedback message transmission. FIG. 9 illustrates one embodiment of a feedback message transmission 900. The feedback message transmission 900 may have a CRC 902 to aid in the detection of errors in the message received by the base station 108. The feedback message transmission 900 may have a message length field 904 for the base station 108. The feedback message transmission 900 may have a UE-preferred transmit antenna adapter representation 906 describing a preferred or recommended transmit antenna adapter. The transmit antenna adapter may modify an antenna precoding instruction 510 to instruct a transmitting unit 406 to configure a set of transmit antennas. The transmit antenna adapter may modify the antenna precoding instruction 510 as an antenna subset selection, an antenna index permutation, and an antenna pattern virtualization.

Figure 10:
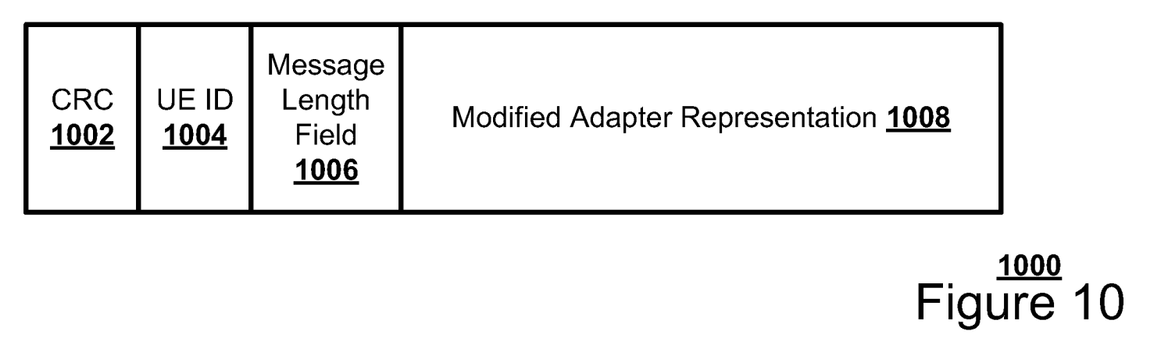
FIG. 10 illustrates, in a block diagram, one embodiment of a modification/confirmation message transmission.

The base station 108 may review the UE-preferred transmit antenna adapter review representation 908 and make some modifications or just confirm. The base station 108 may send these modifications or confirmations to the UE device 104 in a modification/confirmation message transmission. FIG. 10 illustrates, in a block diagram, one embodiment of a modification/confirmation message transmission. The modification/confirmation message transmission 1000 may have a CRC 1002 aid the UE device 104 in determining if an error was mad in the reception of the message. The modification/confirmation message transmission 1000 may have a UE ID 1004 for the UE device 104 and a message length field 1006 for the base station 108. The modification/confirmation message transmission 1000 may have a modified transmit antenna adapter representation 1008 describing a modified transmit antenna adapter or confirmation that the UE-preferred adapter is accepted as the transmit antenna adapter. The transmit antenna adapter may modify an antenna precoding instruction 510 to instruct a transmitting unit 406 to configure a set of transmit antennas. The transmit antenna adapter may modify the antenna precoding instruction 510 as an antenna subset selection 1010, an antenna index permutation 1012, and an antenna pattern virtualization 1014.

Figure 11:
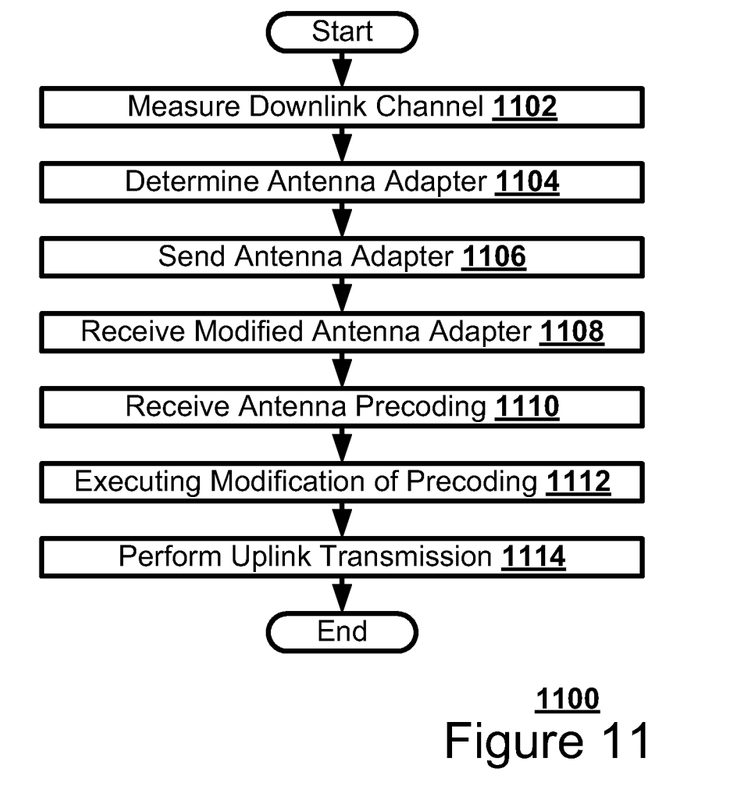
FIG. 11 illustrates, in a flowchart, one embodiment of a method for performing an uplink transmission with a user equipment created transmit antenna adapter.

FIG. 11 illustrates one embodiment of a method 1100 for performing an uplink transmission with a UE determined transmit antenna adapter. The UE device 104 may measure the downlink channel of the down link transmission from the base station 108 (Block 1102). The UE device 104 may determine a UE-preferred transmit antenna adapter based on the downlink channel (Block 1104). The UE device 104 may send a transmit antenna adapter representation describing the UE-preferred transmit antenna adapter to the base station 108 (Block 1106). After the base station 108 has reviewed the transmit antenna adapter representation, the UE device 104 may receive a modified antenna adapter representation or a confirmation from the base station (Block 1108). The UE device 104 may receive from the base station 108 an antenna codebook containing an antenna precoding instruction 510 for an uplink transmission (Block 1110). The UE device 104 may execute a modification of the antenna precoding instruction 510 into a customized precoding according to a transmit antenna adapter (Block 1112). The UE device 104 may then perform the uplink transmission according to the customized precoding (Block 1114).

Figure 12:
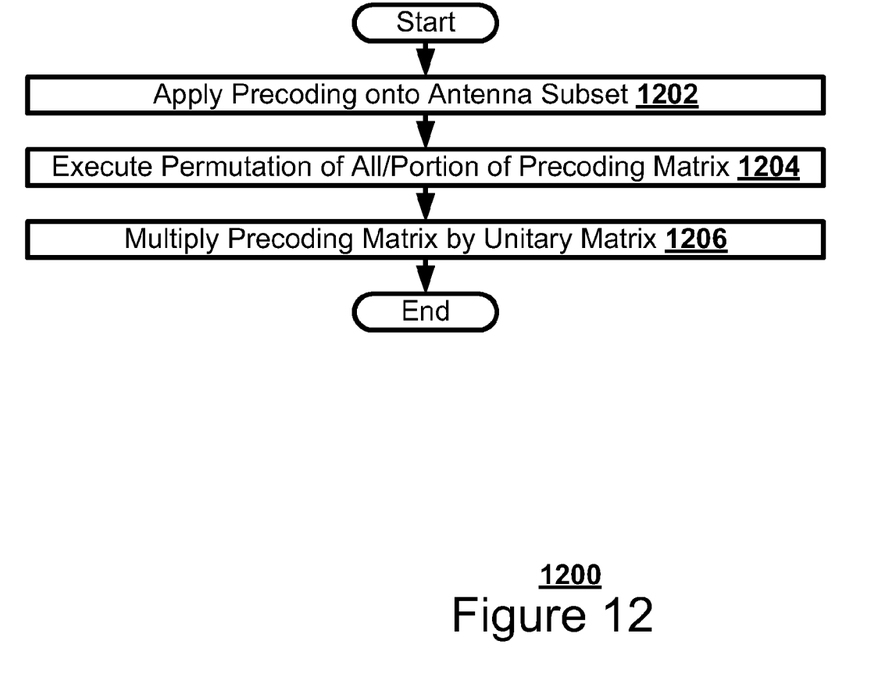
FIG. 12 illustrates, in a flowchart, one embodiment of a method for modifying an antenna precoding instruction with a transmit antenna adapter.

FIG. 12 illustrates one embodiment of a method 1200 for modifying an antenna precoding instruction 510 with a transmit antenna adapter. The antenna precoding instruction 510 may be formatted as an index into a codebook having a set of a precoding matrix. The UE device 104 may apply a precoding entry on all or a subset of transmit antennas chosen according to the transmit antenna adapter (Block 1202). The UE device 104 may execute a permutation of the precoding matrix according to an antenna permutation indicated by the transmit antenna adapter (Block 1204). The permutation may be on the rows of the precoding matrix, or rows of a submatrix of the precoding matrix. The UE device 104 may multiply the precoding matrix on the left by a unitary matrix indicated by the transmit antenna adapter to transform a set of physical antennas to a set of virtualized antennas via weighting the set of physical antennas according to the unitary matrix (Block 1206).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A base station for determining an uplink transmission, comprising:
    a receiving unit that receives an uplink transmission from a wireless terminal device;
    a processor that determines an antenna precoding and a transmit antenna adapter to customize the antenna precoding based on the uplink transmission, where the transmit antenna adapter configures each of a number of antenna precoding outputs, P, for transmission on a single physical antenna; and
    a transmitting unit to send a transmit antenna adapter representation of the determined transmit antenna adapter and an antenna precoding instruction for the determined antenna precoding to the wireless terminal device.

2. The base station system of claim 1, wherein the transmit antenna adapter representation is sent at a different interval than the antenna precoding instruction.

3. The base station system of claim 1, wherein the processor determines the transmit antenna adapter based on an uplink channel correlation obtained from the uplink transmission and an antenna codebook.

4. The base station of claim 1, wherein the number of antenna precoding outputs, P, is less than a number of transmit antennas.

5. A wireless terminal device for performing an uplink transmission, comprising:
    a transmitting unit that sends a transmit antenna adapter representation to a base station;
    a receiving unit that receives from the base station an antenna precoding instruction for an uplink transmission and a modified transmit antenna adapter representation that modifies the sent transmit antenna adapter representation;
    a processor that executes a modification of the antenna precoding instruction according to the modified transmit antenna adapter representation into a customized precoding; and
    a transmitting unit that performs the uplink transmission according to the customized precoding.

6. The wireless terminal device of claim 5,
    wherein the transmitting unit sends the transmit antenna adapter representation to the base station in a feedback message transmission, where the transmit antenna adapter representation comprises a wireless terminal device preferred transmit antenna adapter representation that represents a transmit antenna adapter that modifies an antenna precoding instruction to instruct the transmitting unit to configure a set of transmit antennas, and
    wherein the receiving unit receives the modified transmit antenna adapter representation in a modification message from the base station, where the modified transmit antenna adapter representation is based on the preferred transmit antenna adapter representation.

* * * * *